US008951115B2

(12) United States Patent
D'Amico et al.

(10) Patent No.: US 8,951,115 B2
(45) Date of Patent: Feb. 10, 2015

(54) PROGRESSIVE JACKPOT COMMUNICATION TECHNIQUES

(71) Applicant: Aristocrat Technologies Australia Pty Limited, North Ryde, NSW (AU)

(72) Inventors: Michael H. D'Amico, Las Vegas, NV (US); Tara L. Young, Las Vegas, NV (US); Keith A. Wood, Las Vegas, NV (US); Lattamore D. Osburn, Las Vegas, NV (US)

(73) Assignee: Aristocrat Technologies, Inc.

( * ) Notice: Subject to any disclaimer, the term of this patent is extended or adjusted under 35 U.S.C. 154(b) by 0 days.

(21) Appl. No.: 13/718,247

(22) Filed: Dec. 18, 2012

(65) Prior Publication Data

US 2013/0184067 A1 Jul. 18, 2013

Related U.S. Application Data

(63) Continuation of application No. 12/859,676, filed on Aug. 19, 2010, now Pat. No. 8,357,038, which is a continuation of application No. 12/411,370, filed on Mar. 25, 2009, now abandoned, which is a continuation of application No. 10/458,215, filed on Jun. 10, 2003, now abandoned.

(51) Int. Cl.
*A63F 13/00* (2014.01)
*A63F 13/30* (2014.01)
*G07F 17/32* (2006.01)

(52) U.S. Cl.
CPC ................ *A63F 13/12* (2013.01); *G07F 17/32* (2013.01)
USPC .................... 463/27; 463/25; 463/26; 463/42

(58) Field of Classification Search
CPC ..... A63F 13/00; A63F 13/10; G07F 17/3272; G07F 17/3274
USPC .......................................... 463/25, 26, 27, 42
See application file for complete search history.

(56) References Cited

U.S. PATENT DOCUMENTS

| | | | | |
|---|---|---|---|---|
| 5,766,076 | A * | 6/1998 | Pease et al. | 463/27 |
| 6,241,608 | B1 * | 6/2001 | Torango | 463/27 |
| 6,383,074 | B1 | 5/2002 | Boggs | |
| 2002/0138594 | A1 * | 9/2002 | Rowe | 709/219 |
| 2003/0171145 | A1 * | 9/2003 | Rowe | 463/25 |
| 2003/0181231 | A1 * | 9/2003 | Vancura et al. | 463/9 |

FOREIGN PATENT DOCUMENTS

GB 2378664 A 2/2003

OTHER PUBLICATIONS

Office Action dated Aug. 22, 2013 corresponding to Canadian Patent Application No. 2,525,527.

* cited by examiner

*Primary Examiner* — James S McClellan
(74) *Attorney, Agent, or Firm* — McAndrews, Held & Malloy, Ltd.

(57) ABSTRACT

A gaming system (10) includes gaming machine groups (GR 1-GR 16) arranged to receive input data and to generate output progressive jackpot data relating to two or more progressive jackpots. A central database (26) stores the input data relating to the progressive jackpots. A monitoring computer (40) includes a local database (46). The computer (40) obtains and temporarily stores the progressive jackpot output data.

5 Claims, 3 Drawing Sheets

PROGRESSIVE JACKPOT COMMUNICATION TECHNIQUES

RELATED APPLICATIONS

This application is a continuation of U.S. patent application Ser. No. 12/859,676, filed Aug. 19, 2010, which is a continuation of and claims priority to U.S. patent application Ser. No. 12/411,370, filed Mar. 25, 2009, which is a continuation of and claims priority to U.S. patent application Ser. No. 10/458,215, filed Jun. 10, 2003, now abandoned. The entire disclosure of U.S. patent application Ser. Nos. 12/411,370 and 10/458,215 are incorporated herein by reference.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

This invention relates to gaming systems, and more particularly relates to processing and communication of data related to progressive jackpots calculated by such systems.

A large gaming casino typically employs thousands of gaming machines that can be operated simultaneously. These gaming machines can be used to simultaneously play multiple games using multiple progressive jackpots as rewards. For example, a first group of users simultaneously may be playing a first group of gaming machines employing a first progressive jackpot at multiple gaming facilities, while a second group of users simultaneously may be playing a second group of gaming machines employing a second progressive jackpot at the multiple facilities. Typically, the gaming machines include jackpot meters that generate jackpot data used to calculate the progressive jackpots. The jackpot data is transmitted from each gaming machine and each gaming location to a progressive jackpot server at a remote location, which may receive a large amount of data, including jackpot data, during a short time period. Experience has shown that the data may be lost due to network congestion or to inadequate processing speed to accommodate the large volume of data. In addition, in the past, each progressive jackpot has required a separate link and separate communication line from a gaming facility to the remote location. This results in addition expense to install and maintain the multiple links and communication lines.

Gaming facilities in different locations are increasingly owned by a single legal entity, such as a corporation. There is expected to be a demand for a first group of progressive jackpots based on play of progressive gaming machines located in many, if not all, facilities owned by a single corporation, and demand for a second group of progressive jackpots based on play of progressive gaming machines located in a single one of the commonly-owned gaming facilities. In addition, there is expected to be a demand for progressive games that enable play of a progressive game on gaming machines owned by multiple corporations at multiple gaming facilities. Providing progressive jackpots for these various arrangements' presents problems solved by at least one embodiment of the present invention.

One system for calculating progressive jackpots based on data from multiple gaming facilities is shown in U.S. Pat. No. 5,766,076 (Pease et al, issued Jun. 16, 1998, the '076 patent"). That system includes a processor 138 that aggregates contributions to a progressive jackpot and maintains a current database of gaming machines 108. Data from processor 138 is sent to a central computer system 106 via modems and a network. Other casinos 165 also are connected to the central computer system 106 via a network. Central system 106 does jackpot calculations based on data received from the casinos. However, there appears to be no teaching or suggestion in the '076 patent for transmitting data for multiple progressive jackpots or links over a single communication network. There also appears to be no teaching or suggestion for accommodating progressive jackpots based on machines owned by different corporations.

Another gaming system for calculating a progressive jackpot also is taught in U.S. Pat. No. 6,203,010 (Jorasch et al., issued Mar. 20, 2001). This patent also appears to contain no teaching or suggestion for transmitting data for multiple progressive jackpots or links over a single communication network. There also appears to be no teaching or suggestion for accommodating progressive jackpots based on machines owned by different corporations.

Another system for handling progressive jackpots is described in U.S. Pat. No. 5,752,882 (Acres et al., issue May 19, 1998). As shown in FIGS. 1 and 30, meter information from games is stored locally in floor controllers 18 and 28 before being sent to a file server 32 over an Ethernet network 38 (Col. 2, lines 62-65; Col. 32, lines 40-55). According to Col. 36, lines 16-36, any number of gaming machines on the network can be combined in a common progressive jackpot. A jackpot processing terminal 36 is connected to the network (FIG. 1). The number of progressive jackpots is said not to be limited by the number of floor controllers since one floor controller can manage more than one progressive jackpot. However, the patent does not describe how this objective could be achieved. As shown in FIGS. 1, 29 and 30, a game can request data from the file server 32. The data retrieved from the file server is stored in an outgoing message queue of the floor controller before being sent to a game (Col. 33, lines 47-63). A players name and points are displayed on a vacuum fluorescent display 102 (FIG. 8; Col. 15, line 38-Col. 16, line 30; Col. 26, lines 63-66). There also appears to be no teaching or suggestion for accommodating progressive jackpots based on machines owned by different corporations.

U.S. Pat. No. 5,885,158 (Torango et al.) describes a gaming system for multiple progressive games. According to FIGS. 1A and 1B, gaming machines may be located in different retail locations, such as casinos or regions or portions of casinos (Col. 4, lines 35-40). The gaming machines are arranged to play different progressive games 134a, 134b, and 134c. The machines for game 134b span locations 110a and 110b. The machines for game 134c also are included in the machines for game 134b. Communication lines 132a, 132b, and 132c transmit data to a central system 112, and at least one of the lines carries partial data for calculating more than one progressive jackpot. However, the Torango et al. system does not provide for transmission of data from multiple locations that contribute to multiple progressive jackpots common to those locations.

None of the foregoing patents effectively addresses the problem of reducing the number of communication networks between gaming facilities in different locations that use a common jackpot facility for calculating progressive jackpots played at the gaming facilities, and none addressed the problem of accommodating progressive jackpots based on machines owned by different corporations. The present invention addresses the foregoing problem and provides solutions.

BRIEF SUMMARY OF THE INVENTION

A first apparatus embodiment of the invention is useful for processing a plurality of progressive jackpots in response to data from a plurality of gaming machines. In such an environment, the apparatus comprises a first plurality of gaming machines controlled by a first legal entity and located at a first site. The first plurality of gaming machines are arranged to generate first progressive jackpot data. A second plurality of gaming machines is controlled by the first legal entity and is located at a second site geographically separated from the first site. The second plurality of gaming machines is arranged to generate second progressive jackpot data. A third plurality of gaming machines is controlled by a second legal entity different from the first legal entity and is located at a third site geographically separated from the first site and the second site. The third plurality of gaming machines is arranged to generate third progressive jackpot data. A fourth plurality of gaming machines within the first plurality of gaming machines is controlled by the first legal entity, and the fourth plurality of gaming machines is arranged to generate fourth progressive jackpot data. A fifth plurality of gaming machines within the second plurality of gaming machines is controlled by the first legal entity, and the fifth plurality of gaming machines is arranged to generate fifth progressive jackpot data. A sixth plurality of gaming machines within the third plurality of gaming machines is controlled by the second legal entity, and the sixth plurality of gaming machines is arranged to generate sixth progressive jackpot data. A network is arranged to transmit the first, second, third, fourth, fifth and sixth progressive jackpot data. A progressive jackpot controller is arranged to calculate a first progressive jackpot value at least in part in response to the first, second and third progressive jackpot data, to calculate a second progressive jackpot value at least in part in response to the first and second progressive jackpot data, to calculate a third progressive jackpot value at least in part in response to the third progressive jackpot data, to calculate a fourth progressive jackpot value at least in part in response to the fourth progressive jackpot data, to calculate a fifth progressive jackpot value at least in part in response to the fifth progressive jackpot data, and to calculate a sixth progressive jackpot value at least in part in response to the sixth progressive jackpot data.

A second apparatus embodiment of the invention is useful for processing a first progressive jackpot and a second progressive jackpot. In such an environment, the apparatus comprises first gaming machines at a first gaming facility in a first location arranged to play a first game and arranged to generate first jackpot data used at least in part to calculate the first progressive jackpot. Second gaming machines are located at the first gaming facility, arranged to play a second game and arranged to generate second jackpot data used at least in part to calculate the second progressive jackpot. Third gaming machines are located at a second gaming facility in a second location different from the first location, arranged to play a third game and arranged to generate third jackpot data used at least in part to calculate the first progressive jackpot. Fourth gaming machines are located at the second gaming facility, arranged to play a fourth game and arranged to generate fourth jackpot data used at least in part to calculate the second progressive jackpot. A progressive jackpot server at a location different from at least one of the first location and the second location is arranged to calculate the amount of the first progressive jackpot and the amount of the second progressive jackpot. A communication network is arranged to transmit the first jackpot data, the second jackpot data, the third jackpot data and the fourth jackpot data. A first monitoring computer is coupled to the communication network and is arranged to store the first jackpot data and the second jackpot data before calculation of the first and second jackpot amount by the server, and a second monitoring computer is coupled to the communication network and is arranged to store the third jackpot data and the fourth jackpot data before calculation of the first and second jackpot amount by the server.

A first method form of the invention is useful in a gaming system for processing a plurality of progressive jackpots. In such an environment, the method comprises generating first progressive jackpot data at a first gaming facility controlled by a first legal entity and located at a first site, generating second progressive jackpot data at a second gaming facility controlled by the first legal entity and located at a second site geographically separated from the first site, and generating third progressive jackpot data at a third gaming facility controlled by a second legal entity different from the first legal entity and located at a third site geographically separated from the first site and the second site. Fourth progressive jackpot data is generated at the first gaming facility, fifth progressive jackpot data is generated at the second gaming facility, and sixth progressive jackpot data is generated at the third gaming facility. The first, second, third, fourth, fifth and sixth progressive jackpot data is transmitted. A first progressive jackpot value is calculated at least in part in response to the first, second and third progressive jackpot data. A second progressive jackpot value is calculated at least in part in response to the first and second progressive jackpot data. A third progressive jackpot value is calculated at least in, part in response to the third progressive jackpot data. A fourth progressive jackpot value is calculated at least in part in response to the fourth progressive jackpot data. A fifth progressive jackpot value is calculated at least in part in response to the fifth progressive jackpot data, and a sixth progressive jackpot value is calculated at least in part in response to the sixth progressive jackpot data.

A second method form of the invention is useful in a gaming system for processing a first progressive jackpot and a second progressive jackpot by using a communication network. In such an environment, the method comprises generating first jackpot data used at least in part to calculate the first progressive jackpot at a first gaming facility in a first location, generating second jackpot data used at least in part to calculate the second progressive jackpot at the first gaming facility, and generating third jackpot data used at least in part to calculate the first progressive jackpot at a second gaming facility in a second location different from the first location. Fourth jackpot data is generated and used at least in part to calculate the second progressive jackpot at the second gaming facility. At a location different from at least one of the first location and the second location, the amount of the first progressive jackpot is calculated and the amount of the second progressive jackpot is calculated. Via the communication network, the first jackpot data, the second jackpot data, the third jackpot data and the fourth jackpot data are transmitted. The first jackpot data and the second jackpot data are stored before calculation of the first and second jackpot amount, and the third jackpot data and the fourth jackpot data are stored before calculation of the first and second jackpot amount.

By using techniques of the foregoing type, progressive jackpot gaming data may be stored, processed and communicated with a degree of ease and reliability previously unavailable.

DETAILED DESCRIPTION OF THE INVENTION

Figure 1:
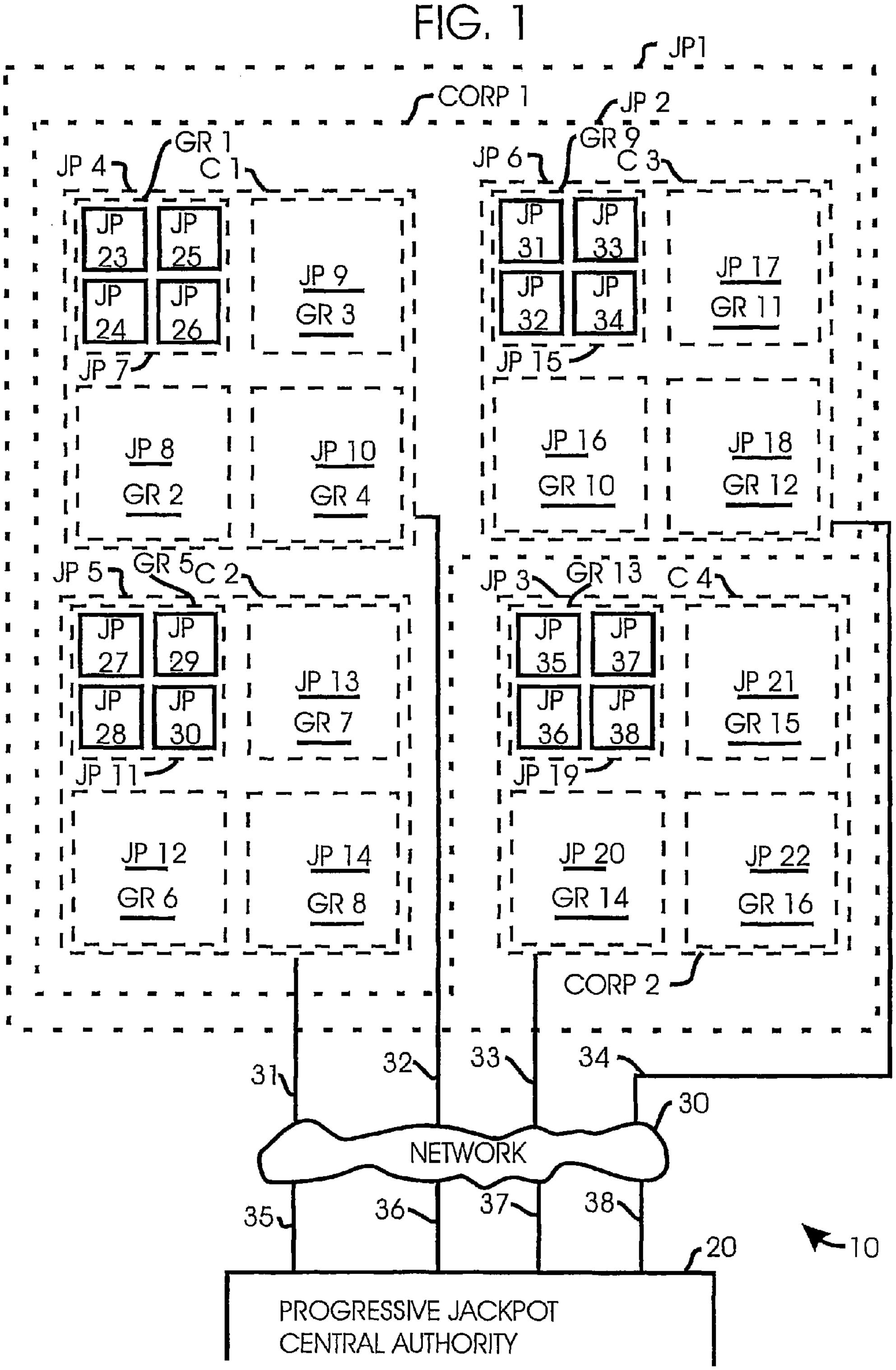
FIG. 1 is a schematic block diagram of one form of gaming system made in accordance with the invention that enables multi-site progressive games controlled by different corporations.

Referring to FIG. 1, one embodiment of a gaming system 10 made in accordance with the invention includes a progressive jackpot central authority 20 that receives progressive jackpot data from various gaming facilities C1-C4 over a conventional network 30, such as a frame relay or internet or direct line. The network transmits data with TCP/IP protocol, or the network may include digital subscriber lines. Other types of networks also may be employed. The network includes network communication lines, such as sets of lines 31-38. Each of lines 31-38 may represent a plurality of lines, depending on the type of protocol used. Lines 31-38 may use any form of communication, including communication employing TCP/IP protocol.

Facilities C1-C4 include casinos located at different locations remote from each other. Casinos C1-C3 are owned or controlled by a common legal entity, such as a first corporation. Casino C4 is owned or controlled by another legal entity, such as a second corporation different from the first corporation.

Each of casinos C1-C4 includes multiple banks of progressive jackpot gaming machines. A bank of gaming machines is a series of machines having some phase of operation in common, such as contributing to one or more common progressive jackpot games.

Central authority 20 calculates multiple progressive jackpot values based on data received from the gaming machines in casinos C1-C4 via network 30. The sources of data from which the various jackpot values are calculated is summarized in the following Table 1:

| Progressive Jackpot Number | Gaming Machines from which Progressive Jackpot Data is received and from which the Progressive Jackpot is Calculated |
|---|---|
| JP 1 | Gaming machines in all of casinos C1-C4 |
| JP 2 | Gaming machines in casinos C1-C3 controlled by a first corporation |
| JP 3 | Gaming machines in casino C4 only. |
| JP 4 | Gaming machines in casino C1 only. |
| JP 5 | Gaming machines in casino C2 only. |
| JP 6 | Gaming machines in casino C3 only. |
| JP 7 | Only from a group GR 1 of banks of gaming machines in casino C1 represented by blocks JP 23-JP 26. |
| JP 8 | Only from a group GR 2 of gaming machines in casino C1. |
| JP 9 | Only from a group GR 3 of gaming machines in casino C1. |
| JP 10 | Only from a group GR 4 of gaming machines in casino C1. |
| JP 11 | Only from a group GR 5 of gaming machines in casino C2 represented by blocks JP 27-JP 30. |
| JP 12 | Only from a group GR 6 of gaming machines in casino C2. |

-continued

| Progressive Jackpot Number | Gaming Machines from which Progressive Jackpot Data is received and from which the Progressive Jackpot is Calculated |
|---|---|
| JP 13 | Only from a group GR 7 of gaming machines in casino C2. |
| JP 14 | Only from a group GR 8 of gaming machines in casino C2. |
| JP 15 | Only from a group GR 9 of gaming machines in casino C3 represented by blocks JP 31-JP 34. |
| JP 16 | Only from a group GR 10 of gaming machines in casino C3. |
| JP 17 | Only from a group GR 11 of gaming machines in casino C3. |
| JP 18 | Only from a group GR 12 of gaming machines in casino C3. |
| JP 19 | Only from a group GR 13 of gaming machines in casino C4 represented by blocks JP 35-JP 38. |
| JP 20 | Only from a group GR 14 of gaming machines in casino C4. |
| JP 21 | Only from a group GR 15 of gaming machines in casino C4. |
| JP 22 | Only from a group GR 16 of gaming machines in casino C4. |
| JP 23 | Only from a singlebank of gaming machines in casino C1 indicated by block JP 23. |
| JP 24 | Only from a single bank of gaming machines in casino C1 group GR 1 indicated by block JP 24. |
| JP 25 | Only from a singlebank of gaming machines in casino C1 group GR 1 indicated by block JP 25. |
| JP 26 | Only from a single bank of gaming machines in casino C1 group GR 1 indicated by block JP 26. |
| JP 27 | Only from a singlebank of gaming machines in casino C2 group GR 5 indicated by block JP 27. |
| JP 28 | Only from a singlebank of gaming machines in casino C2 group GR 5 indicated by block JP 28. |
| JP 29 | Only from a single bank of gaming machines in casino C2 group GR 5 indicated by block JP 29. |
| JP 30 | Only from a singlebank of gaming machines in casino C2 group GR 5 indicated by block JP 30. |
| JP 31 | Only from a singlebank of gaming machines in casino C3 group GR 9 indicated by block JP 31. |
| JP 32 | Only from a singlebank of gaming machines in casino C3 group GR 9 indicated by block JP 32. |
| JP 33 | Only from a singlebank of gaming machines in casino C3 group GR 9 indicated by block JP 33. |
| JP 34 | Only from a single bank of gaming machines in casino C3 group GR 9 indicated by block JP 34. |
| JP 35 | Only from a singlebank of gaming machines in casino C4 group GR 13 indicated by block JP 35. |
| JP 36 | Only from a singlebank of gaming machines in casino C4 group GR 13 indicated by block JP 36. |
| JP 37 | Only from a singlebank of gaming machines in casino C4 group GR 13 indicated by block JP 37. |
| JP 38 | Only from a single bank of gaming machines in casino C4 group GR 13 indicated by block JP 38. |

Gaming machine groups GR 2, GR 3, GR 4, GR 6, GR 7, GR 8, GR 10, GR 11, GR 12, GR 14, GR 15, and GR 16 include multiple single banks of gaming machines for which progressive jackpots, may be calculated as shown in connection with single bank progressive jackpots JP 2.3-JP 38.

Figure 2:
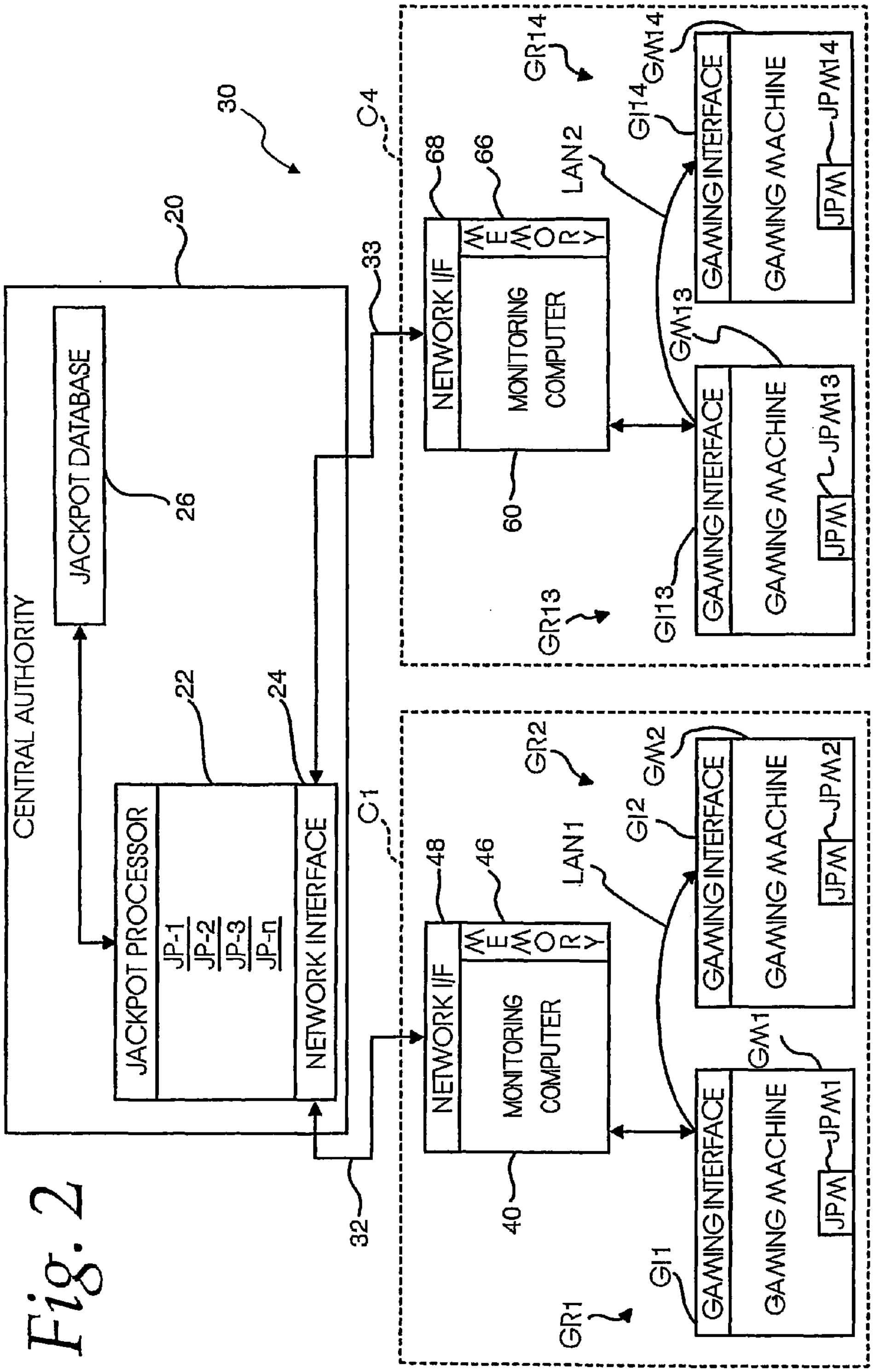
FIG. 2 is a schematic block diagram of one arrangement for implementing the system shown in FIG. 1.

Preferably, if facilities C1-C4 are located within a single state, all jackpots JP 1-JP 38 are calculated by a single jackpot processor, such as processor 22 (FIG. 2). If some of facilities C1-C4 are in different states, there are separate jackpot processors for the jackpots in the different states, one jackpot processor per state. Alternatively, there may be more than one jackpot processor per state.

Any gaming machine that contributes to a jackpot for a single bank (e.g., any of banks JP 23-JP 38) also contributes to at least one of the higher level jackpots. For example, a gaming machine that contributes to JP 23 also contributes to JP 7 of group GR 1, JP 4 of casino C1, JP 2 of casinos C1-C3 and JP 1. Similarly, a gaming machine that contributes to JP 35 also contributes to JP 19 of group CR 13, JP 3 of casino C4, and JP 1.

The invention is not limited to the levels of jackpots shown in FIG. 1, but may employ an unlimited number of jackpot levels. Further, a progressive jackpot may be based on gaming machines located at different properties, and in a scheme different than the jackpots shown in FIG. 1. For example, a jackpot may be formed from jackpot data received from a single bank of gaming machines in casino C1 indicated by block JP-23 and a single bank of gaming machines in casino C4 indicated by block JP 35. As understood, the progressive jackpots are not limited to banks of machines, and are able to be formed from data retrieved from individual gaming machines within a bank if desired.

Referring to FIG. 2, central authority 20 includes a jackpot processor 22 and a network interface 24 that receives progressive jackpot data from network 30. A memory 26 is used to store the progressive jackpot data in jackpot database. Processor 22 calculates the above described progressive jackpot values in a well-known manner.

Still referring to FIG. 2, casino C1 includes an exemplary gaming machine GM 1 within group GR 1 and an exemplary gaming machine GM 2 within group GR 2. Machine GM 1 is coupled to a conventional gaming interface GI 1 and machine GM 2 is coupled to a conventional gaming interface GI 2. Each of gaming machines generates progressive jackpot data for multiple progressive games.

The progressive jackpot data is stored in progressive jackpot meters that form part of each gaming machine. For example, machine GM 1 includes progressive jackpot meters JPM 1 that stores progressive jackpot data for progressive jackpots JP 1, JP 2, JP 4, JP 7 and JP 23. Machine GM 2 includes progressive jackpot meters JPM 2 that store progressive jackpot data for progressive jackpots JP 1, JP 2, JP 4, and JP 8.

Progressive jackpot data from jackpot meters JPM 1 is stored temporarily in interface GI 1 and is transmitted over a local area network LAN 1 to a monitoring computer 40 that temporarily stores the data in a memory 46. Progressive jackpot data from jackpot meters JPM 2 is stored temporarily in interface GI 2 and is transmitted over local area network LAN 1 to monitoring computer 40 that stores the data in memory 46. LAN 1 may use any conventional network protocol, such as RS485 serial protocol and may be configured as an Ethernet network employing TCP/IP protocol.

Interfaces GI 1 and GI 2 may be implemented by a Sentinel™ Interface from Casino Data Systems. Other interfaces and network architectures (e.g., Ethernet, parallel port, and the like) may be substituted. Game interfaces GI 1 and GI 2 may implement, for example, the IGT Gaming SAS™ communication protocol or the CDS GDAP™ communication protocol for communication with gaming machines GM 1 and GM 2, or a custom communication protocol.

Monitoring computer 40 may be organized and constructed like the like-numbered computer described in U.S. application Ser. No. 09/981,459, entitled "Local Database Gaming System Techniques," filed Oct. 16, 2001 in the names of Michael D'Amico et al., which is incorporated by reference in this application in its entirety.

Still referring to FIG. 2, casino C4 includes an exemplary gaming machine GM 13 within group GR 13 and an exemplary gaming machine GM 14 within group GR 14. Machine GM 13 is coupled to a conventional gaming interface GI 13 and machine GM 14 is coupled to a conventional gaming interface GI 14. Each of gaming machines GM 13 and GM 14 generates progressive jackpot data for multiple progressive games.

The progressive jackpot data from machines GM 13 and GM 14 is stored in progressive jackpot meters that form part of each gaming machine. For example, machine GM 13 includes progressive jackpot meters JPM 13 that store progressive jackpot data for progressive jackpots JP 1, JP 3, JP 19, and JP 35. Machine GM 14 includes progressive jackpot meters JPM 14 that store progressive jackpot data for progressive jackpots JP 1, JP 3, and JP 20.

Progressive jackpot data from jackpot meters JPM 13 is stored temporarily in interface GI 13 and is transmitted over a local area network LAN 2 to a monitoring computer 60 that temporarily stores the data in a memory 66. Progressive jackpot data from jackpot meters JPM 14 is stored temporarily in interface GI 14 and is transmitted over local area network LAN 2 to monitoring computer 60 that stores the data in memory 66. LAN 2 may use any conventional network protocol, such as RS485 serial protocol and may be configured as an Ethernet network employing TCP/IP protocol.

Interfaces GI 13 and GI 14 may be implemented by a Sentinel™ Interface from Casino Data Systems. Other interfaces and network architectures (e.g., Ethernet, parallel port, and the like) may be substituted. Game interfaces GI 1 and GI 2 may implement, for example, the IGT Gaming SAS™ communication protocol or the CDS GDAP™ communication protocol for communication with gaming machines GM 13 and GM 14, or a custom communication protocol.

Monitoring computer 60 may be organized and constructed like the like-numbered computer described in U.S. application Ser. No. 09/981,459, entitled "Local Database Gaming System Techniques," filed Oct. 16, 2001 in the names of Michael D'Amico et al., which is incorporated by reference in this application in its entirety. As explained in more detail in the referenced application, computers 40 and 60 can be structured so that they always have sufficient capacity and speed to accommodate any amount of data generated by the game machines. As a result, the overall system never becomes overloaded or bogged down. In addition, no data is lost if network 30 is disabled or if central authority 20 is inoperable. Faster and more accurate operation results.

Gaming machines GM 1, GM 2, GM 13 and GM 14 are exemplary of the machines referenced in connection with FIG. 1 and may be implemented, for example, as slot machines, video poker machines, video roulette machines, and the like. Some groups of the game machines shown in FIG. 2 may employ both the first and second games that can be selected by a player.

As another alternative, networks LAN 1 and LAN 2 may incorporate a digital subscriber line (DSL) network.

All the progressive jackpot data from casino C1 is transmitted over a single set of communication lines 32 to central authority 20. All the progressive jackpot data from casino C4 is transmitted over a single set of communication lines 33 to central authority 20.

Figure 3:
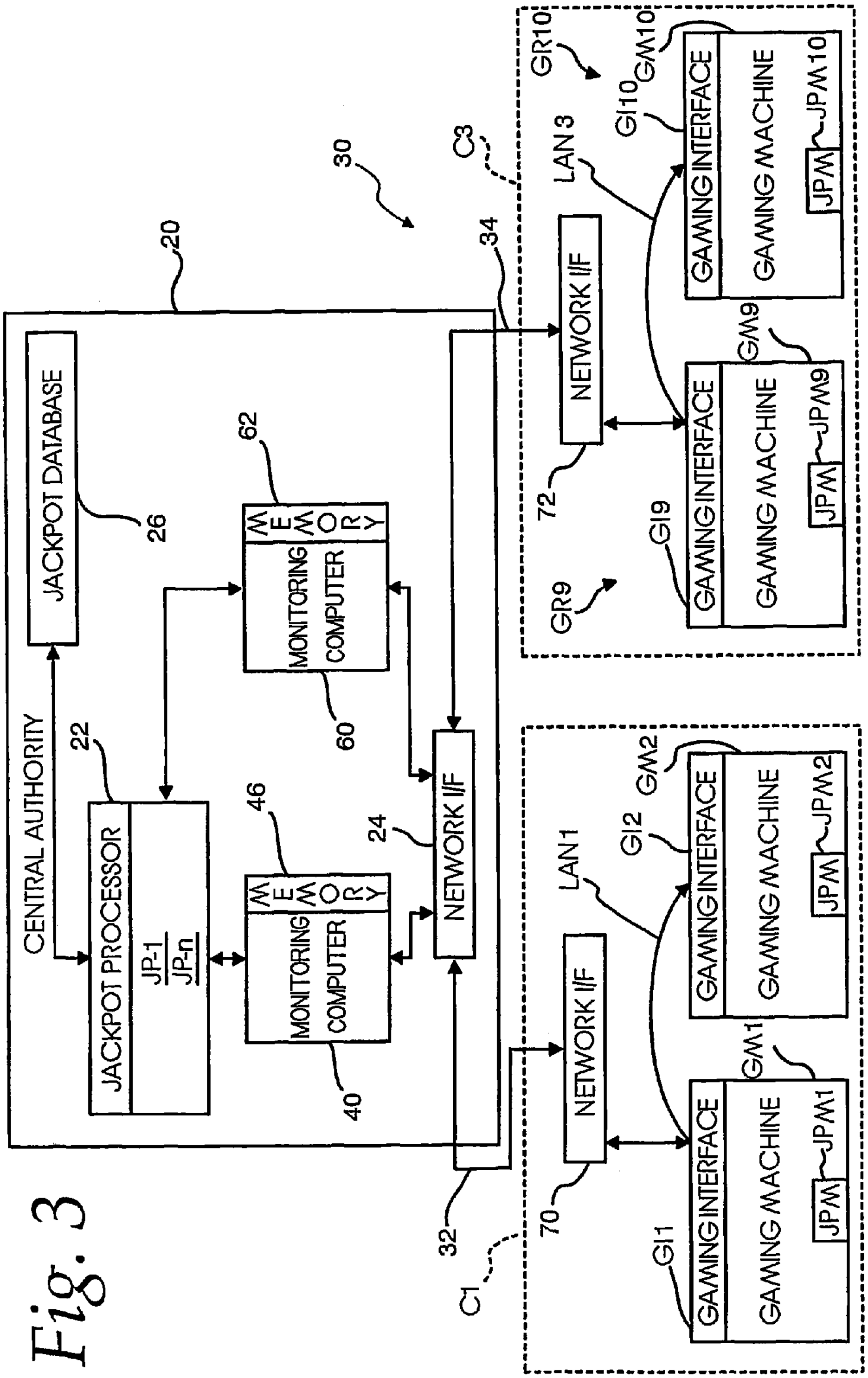
FIG. 3 is a schematic block diagram of a second arrangement for implementing the system shown in FIG. 1.

Referring to FIG. 3, another embodiment employs a rearrangement of network 30 and monitoring computers 40 and 60. The arrangement of gaming machines GM 1 and GM 2 shown in FIG. 3 is identical to the arrangement shown in FIG. 2. However, in FIG. 3, monitoring computers 40 and 60 are moved from casinos C1 and C3, respectively, to central authority 20 as shown.

A network interface 70 within casino C1 transmits the progressive jackpot data from casino C1 to network interface 24 in central authority 20 via network 30 in a well-known manner. A network interface 72 within casino C3 transmits the progressive jackpot data from casino C3 to network interface 24 in central authority 20 via network 30 in a well-known manner. Interfaces 70 and 72 may be identical.

All the progressive jackpot data from casino C3 is transmitted over a single set of communication lines 34 to central authority 20. The progressive jackpot data received from casino C1 over lines 32 is stored in MONITORING COMPUTER 40, and the progressive jackpot data received from casino C3 over lines 34 is stored in CPU 60.

Still referring to FIG. 3, casino C3 includes an exemplary gaming machine GM 9 within group GR 9 and an exemplary gaming machine GM 10 within group GR 10. Machine GM 9 is coupled to a conventional gaming interface GI 9 and machine GM 10 is coupled to a conventional gaming interface GI 10. Gaming machines GM 9 and GM 10 may be constructed like machines GM 1 and GM 2, and interfaces GI 9 and GI 10 may be constructed like interfaces GI 1 and GI 2. Each of gaming machines GM 9 and GM 10 generates progressive jackpot data for multiple progressive games.

The progressive jackpot data is stored in progressive jackpot meters that form part of each gaming machine GM 9 and GM 10. For example, machine GM 9 includes progressive jackpot meters JPM 9 that store progressive jackpot data for progressive jackpots JP 1, JP 2, JP 6, JP 15 and JP 31. Machine GM 10 includes progressive jackpot meters JPM 10 that store progressive jackpot data for progressive jackpots JP 1, JP 2, JP 6, and JP 16.

Progressive jackpot data from jackpot meters JPM 9 is stored temporarily in interface GI 9 and is transmitted over a local area network LAN 3 to network interface 72 that sends the data over network 30 to MONITORING COMPUTER 60 for storage in memory 62, as well as memory 26. Progressive jackpot data from jackpot meters JPM 10 is stored temporarily in interface GI 10 and is transmitted over local area network LAN 3 to network interface 72 that sends the data over network 30 to MONITORING COMPUTER 60 for storage in memory 62, as well as memory 26. LAN 3 may use any conventional network protocol, such as RS485 serial protocol and may be configured as an Ethernet network employing TCP/IP protocol.

Additional details about exemplary game machine GM 1 and exemplary interface GI 1 are described in FIG. 3 of the above-identified application incorporated by reference.

While the invention has been described with reference to one or more preferred embodiments, those skilled in the art will understand that changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

The invention claimed is:

1. In a gaming system having a first and second plurality of gaming machines and a progressive jackpot server, a method of processing a plurality of progressive jackpots arranged in a plurality of progressive jackpot levels comprising:

arranging the first and second plurality of gaming machines into a common group, said arranging the first and second plurality of gaming machines including associating said common group with the highest jackpot level of said plurality of jackpot levels;

arranging the first plurality of gaming machines into a plurality of first groups, said arranging the first plurality of gaming machines including associating each first group with a respective one of the progressive jackpot levels that is lower than the highest jackpot level;

arranging the second plurality of gaming machines into a plurality of second groups, said arranging the second plurality of gaming machines including associating each second group with a respective one of said plurality of progressive jackpot levels that is lower than the highest jackpot level;

generating common progressive jackpot data based at least in part on game play of both the first and second plurality of gaming machines, wherein said generating common progressive jackpot data includes defining the contribution of a gaming machine in said common group of gaming machines towards said highest jackpot level;

generating first progressive jackpot data based at least in part on game play of the first plurality of gaming machines, wherein said generating first progressive jackpot data includes defining the contribution of a gaming machine in a group of said first plurality of gaming machines towards a respective associated progressive jackpot level and at least one higher jackpot level;

generating second progressive jackpot data based at least in part on game play of the second plurality of gaming machines, wherein the second progressive jackpot data is different from and coexisting with the first progressive jackpot data and wherein said generating second progressive jackpot data includes defining the contribution of a gaming machine in a group of said second plurality of gaming machines towards a respective associated progressive jackpot level and at least one higher jackpot level;

transmitting the common progressive jackpot data, the first progressive jackpot data, and the second progressive jackpot data to the progressive jackpot server; and calculating for said common group, via said progressive jackpot server, said first groups and said second groups a progressive jackpot value of said highest jackpot level, each respective associated progressive jackpot levels and the at least one higher jackpot levels based at least in part on the common progressive jackpot data, the first progressive jackpot data, and the second progressive jackpot data.

2. The method of claim 1, wherein said arranging the first plurality of gaming machines into a plurality of first groups includes arranging by a first legal entity, and wherein said arranging the second plurality of gaming machines into a plurality of second groups includes arranging by a second legal entity.

3. The method of claim 2, wherein the first legal entity is a first corporation and the second legal entity is a second corporation.

4. The method of claim 1 wherein said transmitting includes transmitting the first and second progressive jackpot data at least in part via a network.

5. The method of claim 4 and further including locating the progressive jackpot server at a site remote from the first and second plurality of gaming machines.

* * * * *